United States Patent
Fong et al.

(10) Patent No.: US 9,564,816 B2
(45) Date of Patent: *Feb. 7, 2017

(54) CONVERTING LEAKAGE CURRENT TO DC OUTPUT

(71) Applicant: MICROSOFT TECHNOLOGY LICENSING, LLC, Redmond, WA (US)

(72) Inventors: Chee K. Fong, Cupertino, CA (US); Suet F. Tin, Redmond, WA (US); Perry S. Stultz, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/151,735

(22) Filed: Jan. 9, 2014

(65) Prior Publication Data

US 2014/0126245 A1 May 8, 2014

Related U.S. Application Data

(63) Continuation of application No. 12/958,254, filed on Dec. 1, 2010, now Pat. No. 8,692,526.

(51) Int. Cl.
 *H02M 3/335* (2006.01)
(52) U.S. Cl.
 CPC ..... *H02M 3/33546* (2013.01); *H02M 3/33561* (2013.01)
(58) Field of Classification Search
 CPC ............. H02M 3/335; H02M 3/33507; H02M 3/33523; H02M 3/33561

USPC .............. 363/20, 21.01, 21.04, 21.07, 21.08, 363/21.09, 21.1, 21.11, 21.12, 21.15, 363/21.16, 21.17, 21.18, 97; 307/89, 90, 307/91; 323/267, 271

See application file for complete search history.

(56) References Cited

U.S. PATENT DOCUMENTS

| | | | |
|---|---|---|---|
| 4,849,950 A | 7/1989 | Sugiura et al. | |
| 5,027,264 A | 6/1991 | DeDoncker et al. | |
| 5,615,091 A | 3/1997 | Palatnik | |
| 6,314,003 B2 * | 11/2001 | Preller | 363/21.04 |
| 6,563,718 B1 * | 5/2003 | Li et al. | 363/16 |
| 6,715,340 B2 * | 4/2004 | Yamada et al. | 73/35.08 |
| 6,757,183 B2 * | 6/2004 | Feldtkeller | H02M 1/36 363/21.1 |
| 6,956,417 B2 | 10/2005 | Bernstein et al. | |
| 7,102,356 B2 | 9/2006 | Wild | |
| 7,230,488 B2 | 6/2007 | Tsuruya | |

(Continued)

FOREIGN PATENT DOCUMENTS

| | | |
|---|---|---|
| CN | 1407702 A | 4/2003 |
| TW | 200835128 A | 8/2008 |

OTHER PUBLICATIONS

State Intellectual Property Office of the People's Republic of China, Office Action Issued in Chinese Patent Application No. 201110409188.1, Jun. 27, 2014, 14 Pages.

(Continued)

*Primary Examiner* — Gary L Laxton
(74) *Attorney, Agent, or Firm* — Micah Goldsmith; Judy Yee; Micky Minhas

(57) ABSTRACT

A power source capable of supplying power to operate electronics of a system is disclosed. In one example, the power source takes advantage of an electrical potential difference between primary and secondary grounds. The power source can reduce system cost and power consumption.

18 Claims, 9 Drawing Sheets

(56) References Cited

U.S. PATENT DOCUMENTS

| | | |
|---|---|---|
| 7,254,047 B2 | 8/2007 | Ren et al. |
| 7,525,826 B2 | 4/2009 | Iwamoto et al. |
| 7,848,119 B2 | 12/2010 | Zheng et al. |
| 8,692,526 B2 * | 4/2014 | Fong ................ H02M 3/33546 323/267 |
| 2001/0015648 A1 | 8/2001 | Tokita |
| 2006/0109696 A1 | 5/2006 | Ren et al. |
| 2007/0247132 A1 | 10/2007 | Iwamoto et al. |

OTHER PUBLICATIONS

Walder, JP et al., "Custom Integrated Front-End Circuit for the CMS Electromagnetic Calorimeter", IEEE Transactions on Nuclear Science, vol. 48, No. 6, Dec. 2001, 5 pages.

State Intellectual Property Office of China, Office Action for Chinese Patent Application No. 201110409188.1, Nov. 26, 2013, 12 pages.

United States Patent and Trademark Office, Office Action Issued in U.S. Appl. No. 12/958,254, filed Mar. 14, 2013, 8 pages.

United States Patent and Trademark Office, Office Action Issued in U.S. Appl. No. 12/958,254, filed Aug. 22, 2013, 10 pages.

State Intellectual Property Office of the People's Republic of China, Third Office Action Issued in Application No. 201110409188.1, Nov. 3, 2014, 6 pages.

* cited by examiner

CONVERTING LEAKAGE CURRENT TO DC OUTPUT

CROSS REFERENCE TO RELATED APPLICATIONS

This application is a continuation of U.S. patent application Ser. No. 12/958,254, filed on Dec. 1, 2010, and titled "CONVERTING LEAKAGE CURRENT TO DC OUTPUT" the entire disclosure of which is incorporated by reference.

BACKGROUND

Consumer and commercial electronic systems may be operated at lower level direct current (DC) voltages (e.g., 5 volts DC). The lower level DC voltage may be provided to a microcontroller and other electronic components within the electronic system via a switching power supply. However, in some electronic systems a second or auxiliary voltage may be used for electronic components of the electronic system that operate at a voltage that is different than the output voltage of the switching power supply.

SUMMARY

The inventors herein have developed a method for supplying primary and secondary power sources, the method comprising: producing a first voltage via a transformer, the transformer including a primary ground electrically and a secondary ground; and producing a regulated second voltage via a potential difference between the primary ground and the secondary ground.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
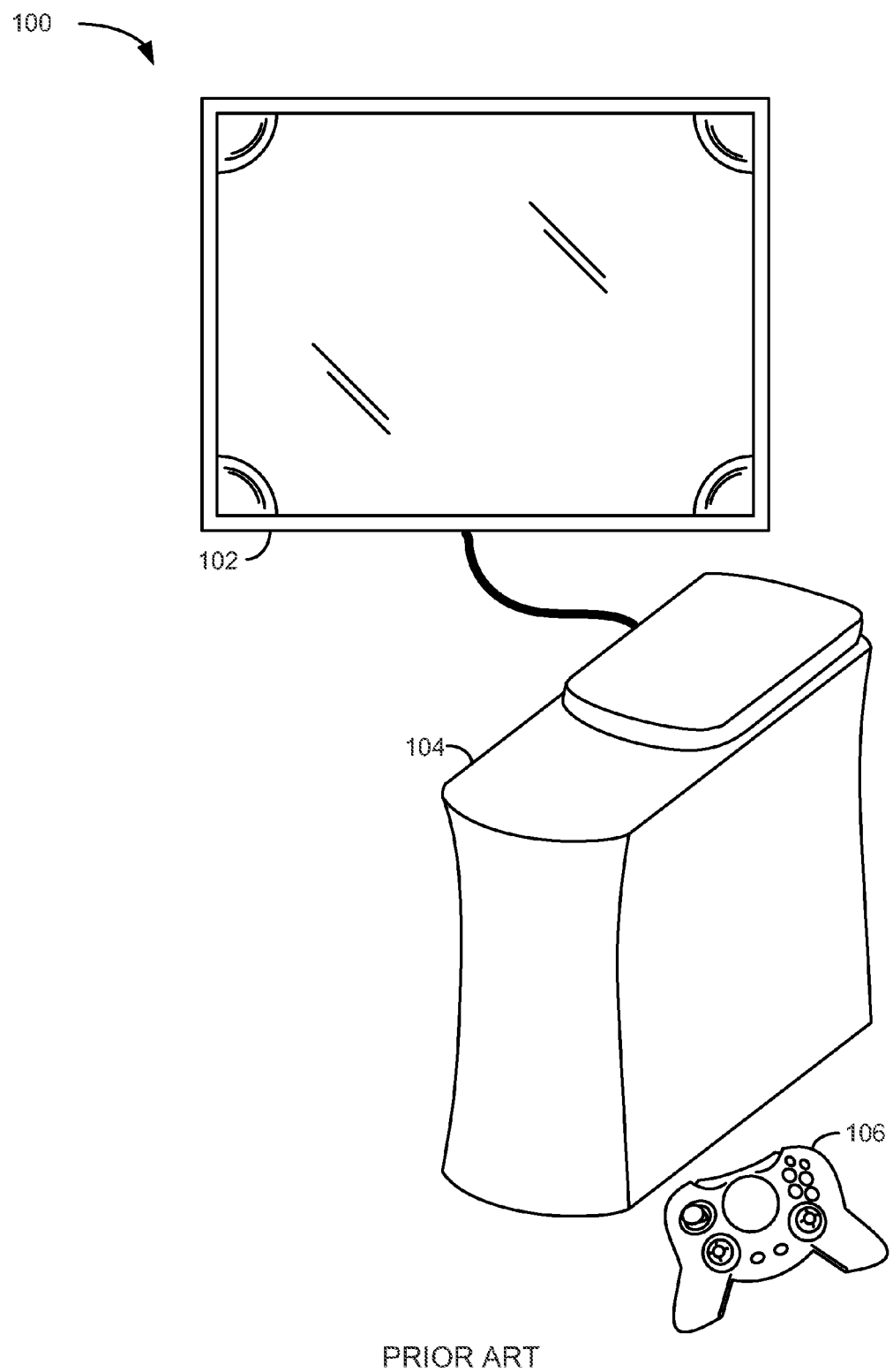
FIG. 1 shows an example electronic system where leakage current and switching noise can be converted to DC output.
Figure 3:
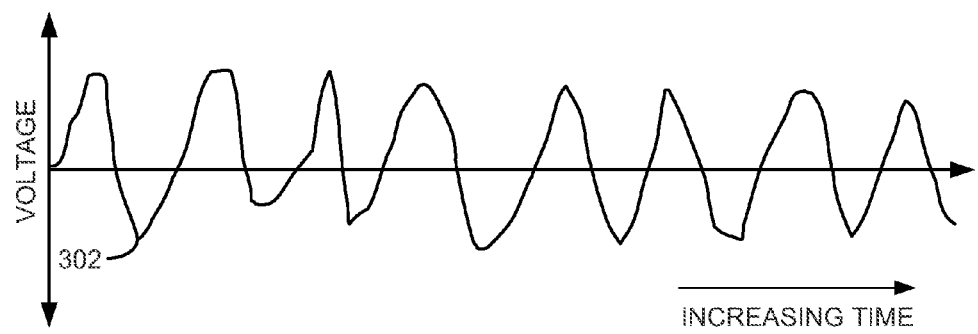
FIG. 3 shows an example prophetic plot of a potential difference between a primary ground and a secondary ground.
Figure 4:
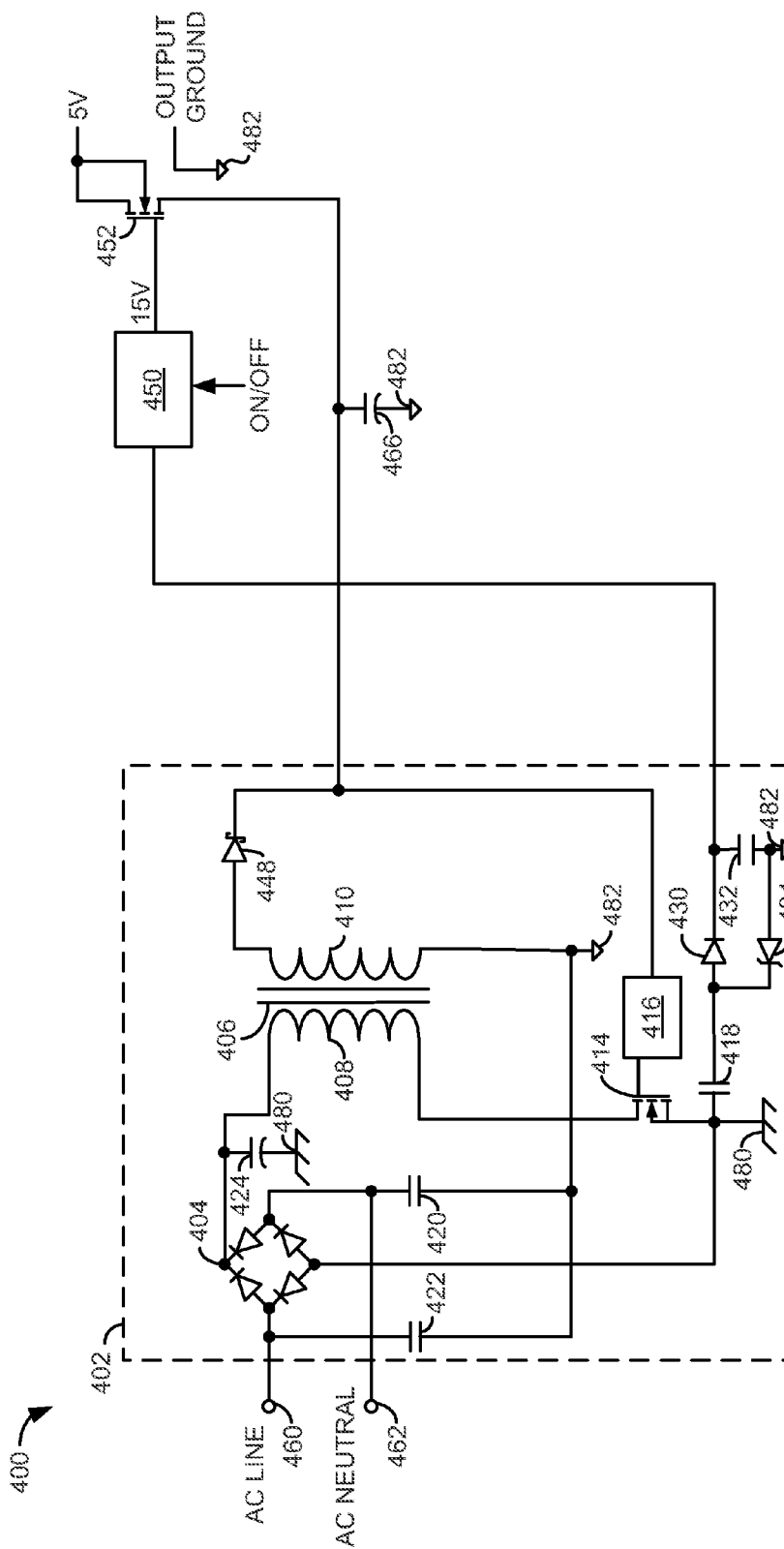
FIG. 4 shows an example circuit for converting leakage current and switching noise to DC output referenced to a secondary ground.
Figure 5:
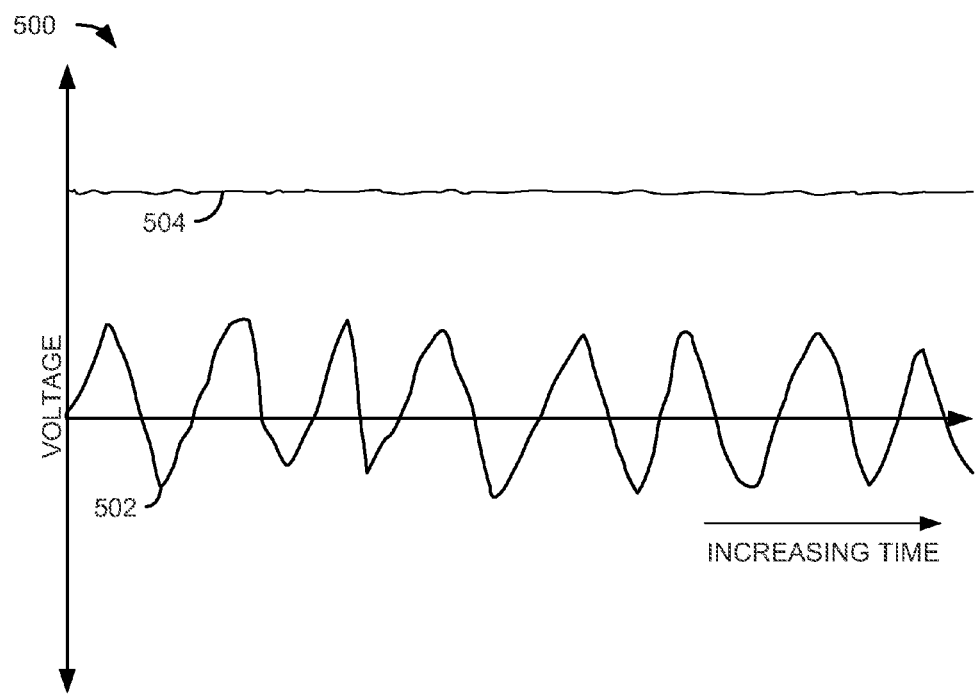
FIG. 5 shows an example plot of a potential difference between a primary ground and a secondary ground as well as output of a voltage source that converts leakage current and switching noise to DC output.
Figure 6:
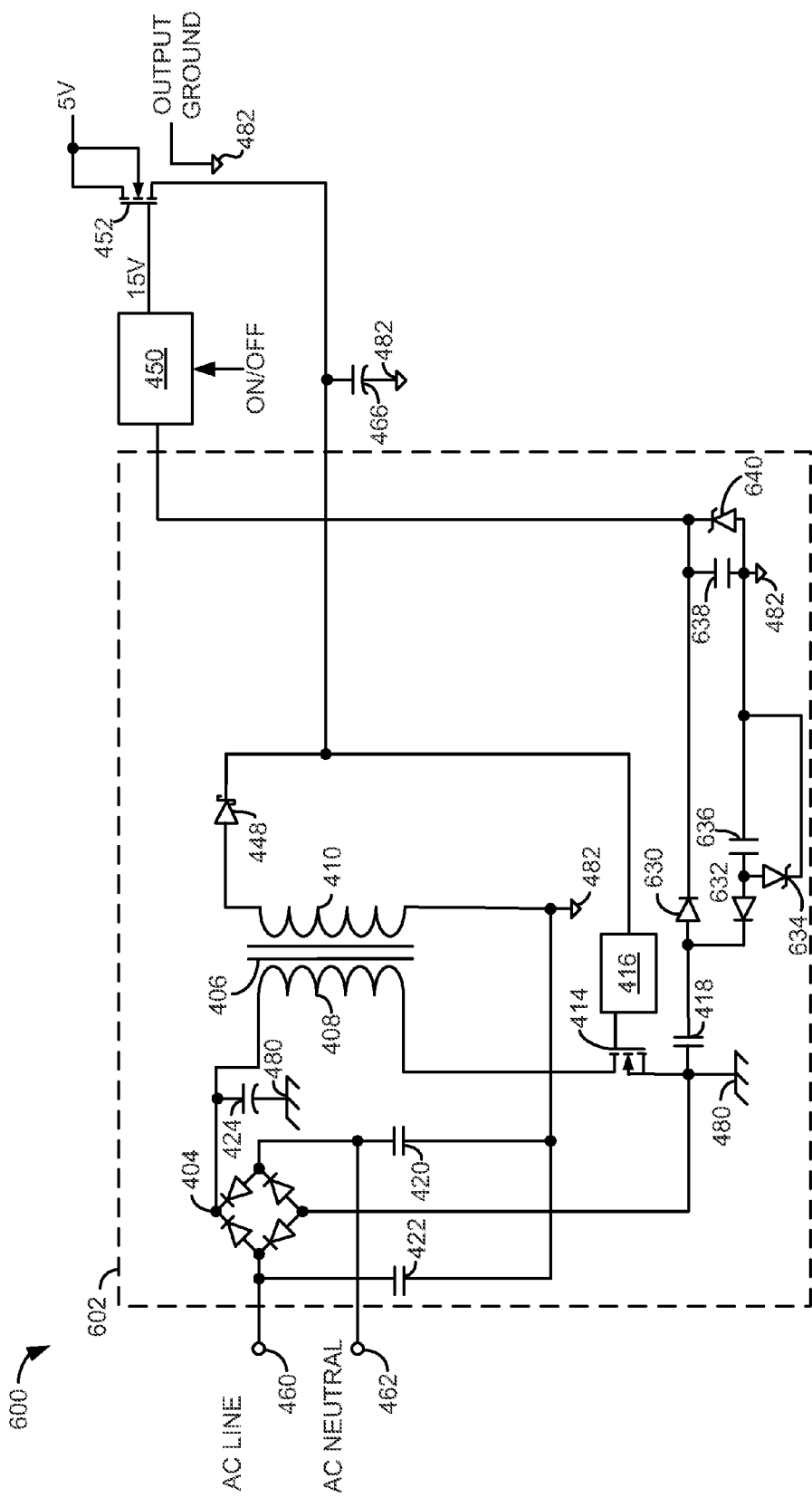
FIG. 6 shows an example circuit for converting leakage current and switching noise to two levels of DC output referenced to a secondary ground.
Figure 7:
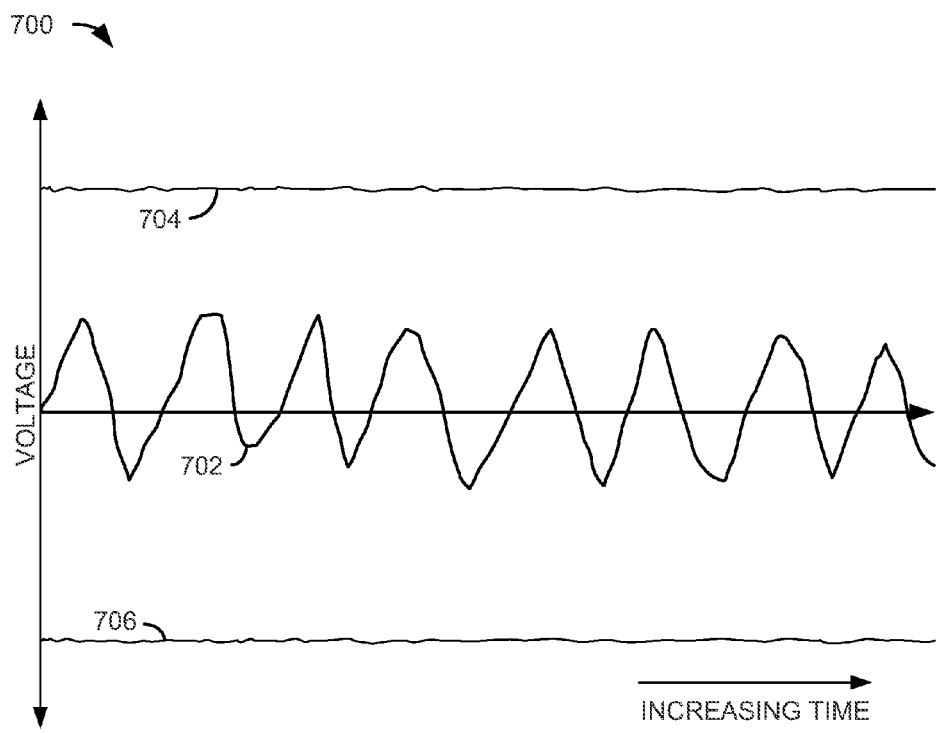
FIG. 7 shows an example plot of a potential difference between a primary ground and a secondary ground as well as output of two voltage sources that convert leakage current and switching noise to DC output.
Figure 8:
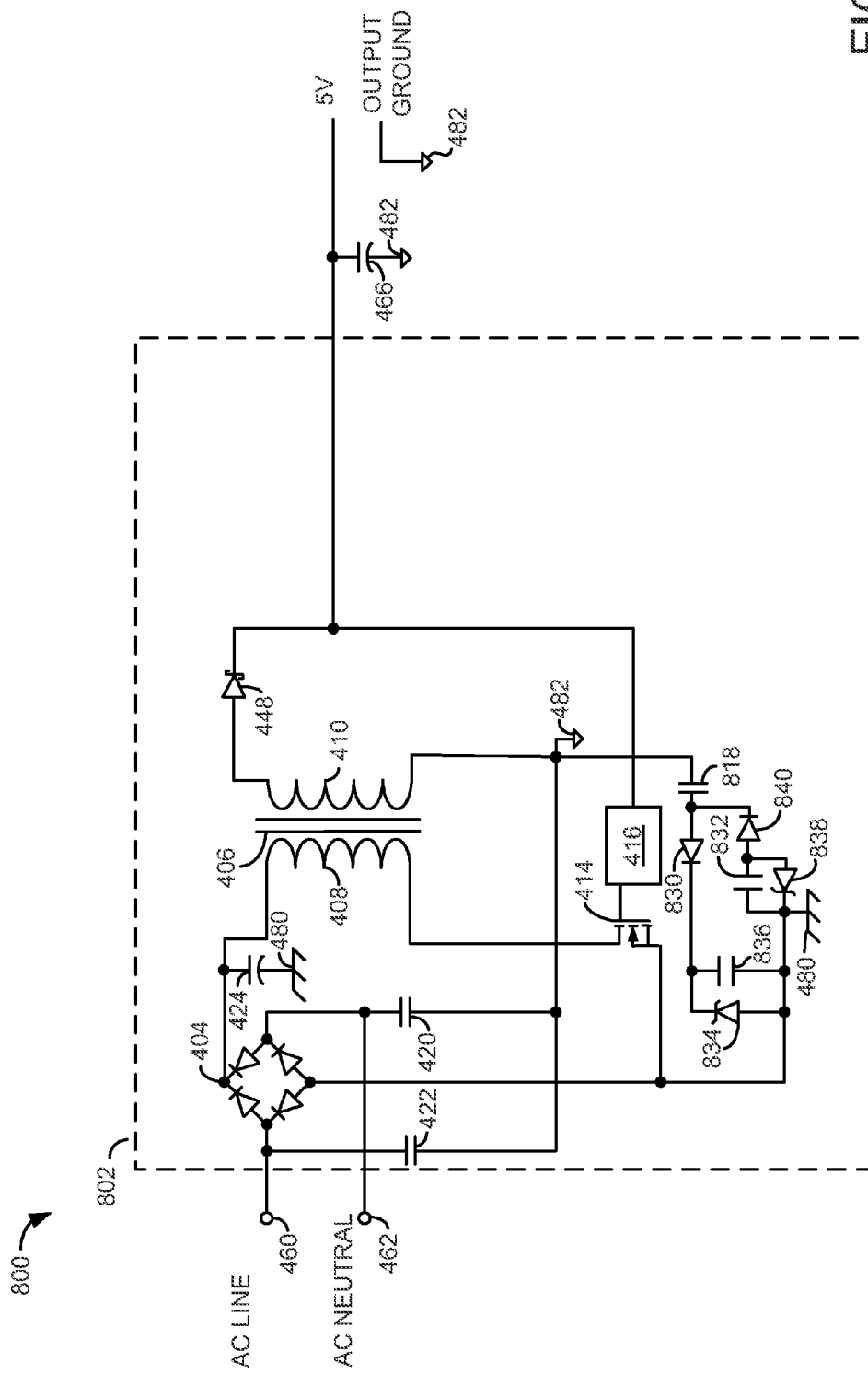
FIG. 8 shows an example circuit for converting leakage current and switching noise to two levels of DC output referenced to a primary ground.
Figure 9:
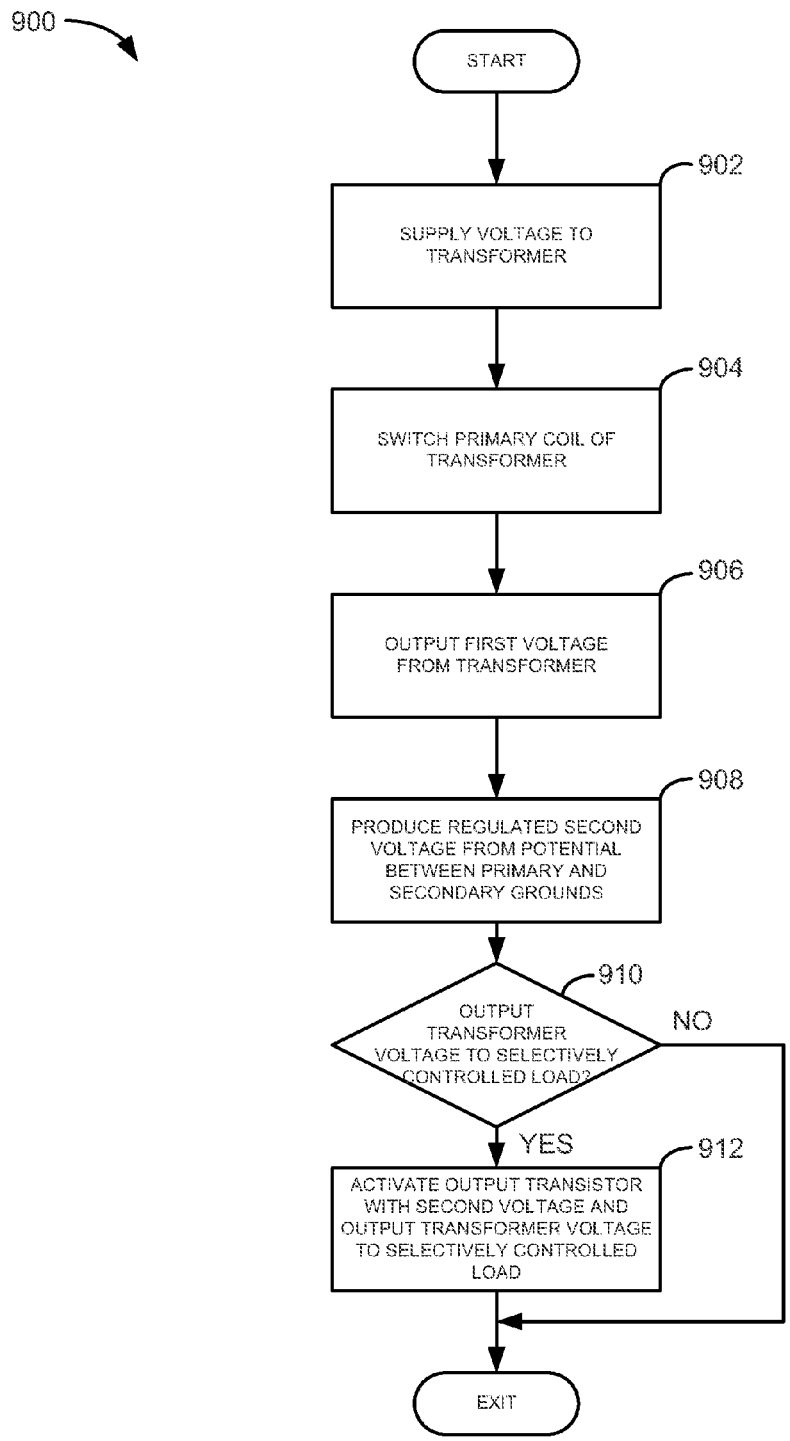
FIG. 9 shows an example method for converting leakage current and switching noise to DC output.

The present description is related to converting leakage current and switching noise to a regulated DC output voltage. In one example, two voltage levels are provided to a system as is shown in FIG. 1 via a switching power supply and a voltage regulation circuit such as is shown in FIG. 4. The first voltage is provided via a secondary coil of the switching power supply, and the second voltage is provided via an electrical potential difference between a primary ground and a secondary ground. FIGS. 6 and 8 illustrate alternative examples for providing second and third voltages via an electrical potential difference between the primary ground and the secondary ground. FIGS. 3, 5, and 7 show prophetic examples of an electrical potential difference between primary and secondary grounds as well as regulated voltages converted from leakage current and switching noise. A method for converting leakage current and switching noise to DC output is shown in FIG. 9.

Referring now to FIG. 1, an example electronic system where leakage current and switching noise can be converted to DC output is shown. Electronic system 100 may include a display 102 for providing visual information to an operator. Electronic system 100 may also include a chassis 104 that houses a power supply and electronics powered by the power supply. Electronic system 100 is also shown with optional hand-held controller 106 for operator input to electronic system 100. In one example, the system is a game console and components within chassis 104 may execute instructions for video gaming. In other examples, electronic system 100 may include electronics for an appliance (e.g., microwave oven), computer, or other consumer electronics. Further, in some examples, electronic system 100 may include electronics and executable code for commercial applications such as computers, oscilloscopes, and instrumentation. The electronics of display 102, chassis 104, and hand-held controller 106 of electronic system 100 may operate with a plurality of voltage levels. For example, a microcontroller of electronic system 100 may operate at a first voltage while a power control switch may operate at a second voltage.

Figure 2:
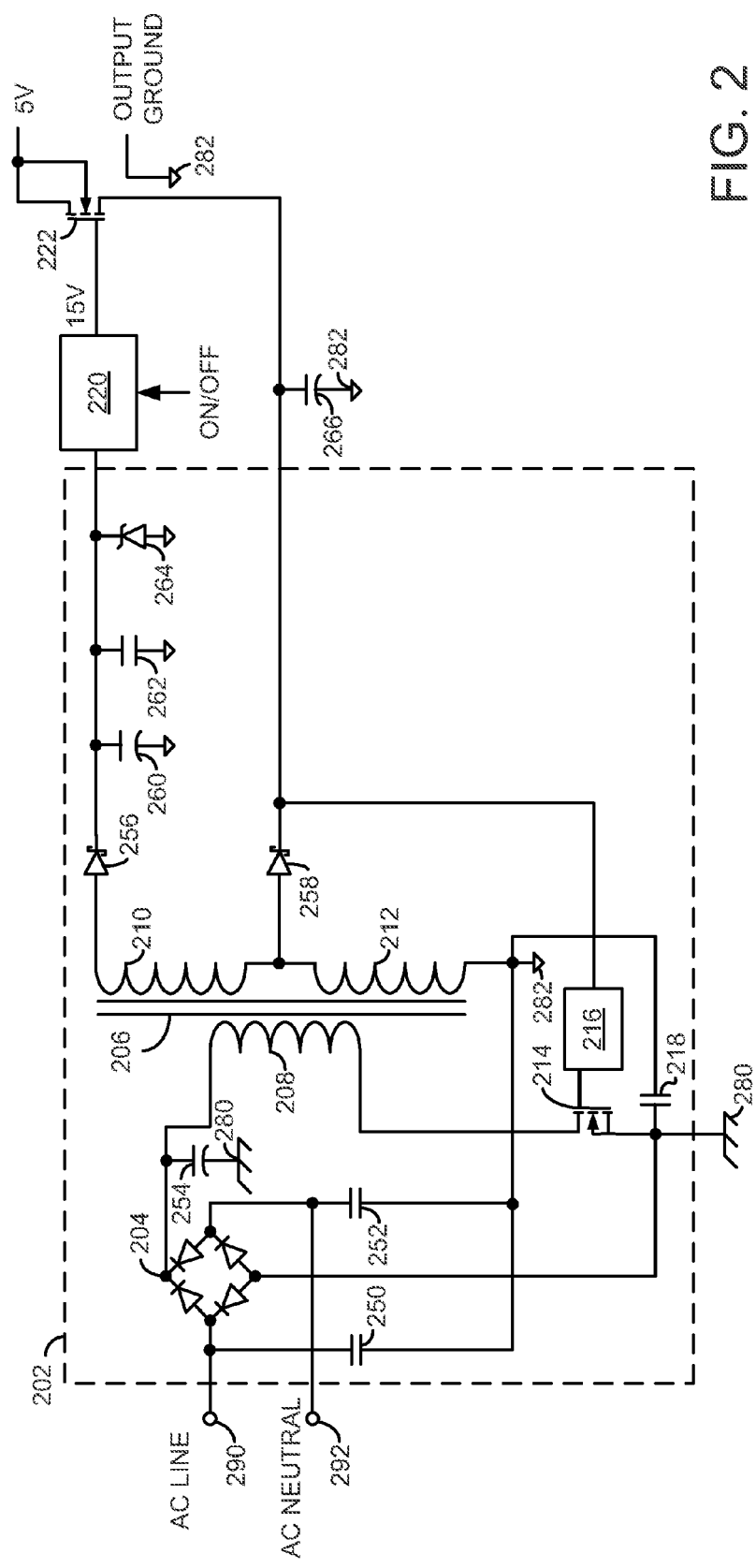
FIG. 2 shows a prior art circuit for providing two levels of DC output referenced to secondary ground.

Referring now to FIG. 2, a prior art circuit for providing two levels of DC output referenced to secondary ground is shown. Electrical system 200 includes power supply 202 for adjusting an AC input voltage into a lower level system voltage (e.g., 5 volts). AC is input to power supply 202 via terminals 290 and 292. AC is rectified to DC via full wave rectifier 204. A DC voltage is output from full wave rectifier 204, filtered by bulk capacitor 254, and is electrically coupled to transformer 206. In particular, the DC voltage is electrically coupled to one side of primary coil 208. The other side of primary coil 208 is electrically coupled to switching transistor 214. Switching transistor 214 is also coupled to primary ground 280. The duty cycle (e.g., ratio of on time to off time) that switching transistor 214 is switched is controlled by isolation and pulse width modulation circuitry 216. Power is stored in the primary coil 208 and transferred to secondary coil 212 and auxiliary coil 210. Y capacitors 250, 252, and 218 reduce electromagnetic interference and are electrically coupled to the AC input lines, primary ground 280, and secondary ground 282.

Secondary coil 212 outputs a system voltage (e.g., a voltage that is used to power at least a portion of the electronics within electrical system 200) that is made available to system electronics when field effect transistor (FET) 222 is activated (e.g., turned on by applying a voltage to the gate of FET 222). The output of secondary coil 212 is a lower voltage (e.g., 5 volts) that is rectified by Schottky diode 258 and filtered by bulk capacitor 266. FET 222 can be activated by a higher voltage (e.g., 15 volts) from auxiliary coil 210. The output of auxiliary coil 210 is rectified by Schottky diode 256, filtered by bulk capacitor 260 and ceramic capacitor 262, and then regulated via zener diode 264. The voltage from auxiliary coil 210 may activate FET 222 when push button switch 220 is activated by an operator.

Thus, in order to provide two voltages referenced to the secondary ground 282, the prior art circuit requires an auxiliary coil and rectification and filtering circuitry. The auxiliary coil increases system cost and weight. The auxiliary coil can also reduce the electrical system efficiency because of losses related to transferring electrical energy from the primary coil to the auxiliary coil.

Referring now to FIG. 3, an example prophetic plot of an electrical potential difference between a primary ground and a secondary ground is shown. In particular, signal 302 represents an electrical potential difference between a primary ground and a secondary ground. The Y axis represents a voltage level while the X axis represents time. A voltage level above the X axis is positive while a voltage level below the X axis is negative. Thus, FIG. 3 shows that the electrical potential difference between a primary ground and a secondary ground varies in amplitude and time.

In one example, an electrical potential difference similar to signal 302 occurs in a system where alternating current (AC) is rectified to DC, and the DC is input to a coil (e.g., primary coil) on the primary side of a power supply transformer. The coil is switched to the primary ground to provide an output at the secondary coil of the transformer. The output from secondary coil is rectified into DC. The primary ground is a ground on the primary side of a transformer that adjusts an input voltage to a system level voltage at the secondary coil of the transformer. The primary coil of the transformer may be referenced and switched to the primary ground to operate the transformer. The secondary coil of the transformer is referenced to the secondary ground on the secondary side of the transformer. The primary ground is electrically isolated from the secondary ground. However, in some systems a Y capacitor may be present between the primary and secondary grounds to suppress electromagnetic interference. Signal 302 represents a voltage or electrical potential that can develop between the primary ground and the secondary ground. The peak-to-peak voltage developed between the primary and secondary grounds can be more than 50 volts peak-to-peak.

The electrical potential shown in FIG. 3 represents electrical potential between the primary ground and the secondary ground that may result from a combination of leakage current and switching noise. The leakage current may originate from semiconductors such as transistors and diodes. Further, leakage current may originate from capacitors, the printed circuit board, and the transformer. In some examples, leakage current may result from materials not being ideal electrical insulators. In other examples, leakage current may result from a circuit coupling with the magnetic field of the power supply transformer. Thus, it can be seen from FIG. 3 that an electrical potential difference can exist between a primary ground and a secondary ground of a power supply. And, the electrical potential difference between the primary and secondary grounds shown in FIG. 3 may be the basis for generating voltages that are different than the output voltage of the transformer secondary coil.

FIGS. 4, 6, and 8 depict examples of example circuits for converting leakage current and switching noise to DC output. It will be appreciated that like referenced characters designate identical or corresponding components and units throughout the several examples.

Referring now to FIG. 4, an example circuit for converting leakage current and switching noise to DC output referenced to a secondary ground is shown. The primary ground 480 is the ground on the primary (e.g., input) side of transformer 406. The primary ground 480 is designated with a fork like symbol. The secondary ground 482 is the ground on the secondary (e.g., output) side of transformer 406. The secondary ground 482 is designated with a triangle symbol. The primary and secondary grounds are isolated from each other except in this example Y capacitor 418 is positioned between the primary ground and the secondary ground. Y capacitors 418, 420, and 422 may be used to reduce electromagnetic interference.

Electrical system 400 includes power supply 402 for adjusting an AC input voltage into a lower level system voltage (e.g., 5 volts). AC is input to power supply 402 via terminals 460 and 462. AC line power is electrically coupled to terminal 460 and AC neutral is coupled to terminal 462. AC is rectified to DC via full-wave rectifier 404. A DC voltage is output from full wave rectifier 404 and is electrically coupled to transformer 406 after the voltage is filtered by bulk capacitor 424. In particular, the DC voltage is electrically coupled to one side of primary coil 408. The other side of primary coil 408 is electrically coupled to switching transistor 414. Switching transistor 414 is also coupled to primary ground 480. Switching transistor 414 periodically conducts when activated (e.g., turned on by applying a voltage to the gate) and periodically acts as an open circuit when not activated (e.g. turned off by removing a voltage from the gate). The duty cycle (e.g., ratio of on time to off time) that switching transistor 414 is switched is controlled by isolation and pulse width modulation circuitry 416. In one example, the duty cycle output by isolation and pulse width modulation circuitry 416 is related to the load applied to the output of transformer 406. Power is stored in the primary coil 408 via a magnetic field when the switch is activated. The magnetic field collapses when the switching transistor 414 is deactivated inducing current flow in secondary coil 410. The output of coil 410 is rectified by Schottky diode 448 and the output voltage at the cathode of Schottky diode 448 is filtered by the bulk filter capacitor 466. The output voltage is also in communication with or electrically coupled to the feedback circuit of the pulse width modulation circuit 416

Secondary coil 410 outputs a system voltage (e.g., a voltage that is used to power at least a portion of the electronics within electrical system 400) that is made available to system electronics when field effect transistor (FET) 452 is activated (e.g., turned on by applying a voltage to the gate of FET 452). The voltage output of secondary coil 410 may vary from application to application. For example, in some systems the output of power supply 402 is 5 volts DC. In other examples, the output of power supply 402 is 15 volts DC.

In the present example, FET 452 may be activated by supplying a second level DC voltage to the gate of FET 452. The second level DC voltage is a different voltage level as compared to the voltage level output by secondary coil 410 and the second level DC voltage must be higher than the voltage level output by the secondary coil 410 in order to turn "on" FET 452. For example, FET 452 can be activated or turned on by applying 15 volts to the gate of FET 452. A voltage can be supplied to the gate of FET 452 via operator control 450. In one example, operator control 450 is a push button switch. The push button switch may provide selective electrical continuity between a power source and the gate of FET 452. Thus, operator control 450 is capable of selectively putting a power source in communication with the gate of FET 452.

Diode 430, zener diode 434, and capacitor 432 are electrically coupled to comprise a voltage regulation circuit whereby an electrical potential difference between primary ground 480 and secondary ground 482 is converted into a regulated voltage referenced to secondary ground 482. Diode 430 allows current to flow from primary ground 480 through Y capacitor 418 and to capacitor 432 when diode 430 is forward biased. Diode 430 blocks current flow from capacitor 432 through Y capacitor 418 and to primary ground 480 when diode 430 is reverse biased. Capacitor 432 stores charge, capacitor 432 also filters an output voltage taken from between diode 430 and capacitor 432. Zener diode 434 permits current to flow from secondary ground 482 through Y capacitor 418 and to primary ground 480 when zener diode 434 is forward biased. Zener diode 434 limits current flow from primary ground 480 through Y capacitor 418 to secondary ground 482 at voltages less than the zener breakdown voltage of zener diode 434 and when zener diode 434 is reverse biased. Zener diode 434 allows current flow from primary ground 480 through Y capacitor 418 to secondary ground 482 when a voltage greater than the zener breakdown voltage of zener diode 434 is present and when zener diode 434 is reverse biased. Thus, zener diode 434 acts to regulate the voltage of capacitor 432 to the zener breakdown voltage, and provides the return path for negative leakage and noise voltage from secondary ground 482 to the primary ground 480 via Y capacitor 418.

An electrical potential difference between primary ground 480 and secondary ground 482 may be the result of leakage current and switching noise produced by opening and closing switching transistor 414. In one example, the zener breakdown voltage can be selected at 15.0 volts, a voltage suitable to activate FET 452. However, different zener diodes with different zener breakdown voltages can be selected to provide different output voltage levels. In this example, the 15 volt output is shown in communication with or electrically coupled to the operator control 450 for activating and deactivating FET 452.

The circuitry of FIG. 4 allows multiple voltage outputs of different voltage levels from a single switching power supply. Further, the circuitry of FIG. 4 allows different voltages to be produced by power supply 402 with a single secondary coil so that the weight and cost of a transformer auxiliary coil, capacitors, Schottky diode, and zener diode used to power FET 452 may be avoided. Further still, since an additional voltage is produced from voltage related to switching noise and leakage current, the additional voltage is provided with no loss of efficiency of transformer 406. And, since Y capacitor 418 is in series with capacitor 432 and since Y capacitor 418 is sized with a small amount of capacitance (e.g., 1.5 nF) relative to capacitor 432 (e.g., 0.1 uF), current flow from primary ground 480 to secondary ground 482 can be limited to less than 5 mA as like capacitor 432 is not in the circuit.

Referring now to FIG. 5, an example prophetic plot of a potential difference between a primary ground and a secondary ground as well as output of a voltage source that converts leakage current and switching noise to DC output is shown. In particular, the signals of FIG. 5 are representative for the electrical circuit of FIG. 4. Signal 502 represents an electrical potential difference between a primary ground 480 and a secondary ground 482 for the circuit of FIG. 4. Signal 504 represents output of a voltage source (e.g., elements 430, 432, and 434 of FIG. 4) that converts leakage current and switching noise to DC output. The Y axis represents a voltage level while the X axis represents time. A voltage level above the X axis is positive while a voltage level below the X axis is negative. Thus, FIG. 5 like FIG. 3 shows that the electrical potential difference between a primary ground and a secondary ground varies in amplitude and time.

In this example, signal 504 is taken between capacitor 432 and diode 430 from the circuit shown in FIG. 4. Signal 502 and signal 504 are shown at different scale and are not shown for voltage level comparisons, but are rather illustrated to show that signal 504 can be produced from the voltage of signal 502.

Referring now to FIG. 6, an example circuit for converting leakage current and switching noise to two levels of DC output referenced to a secondary ground is shown. The elements of FIG. 6 that have the same numerical identifiers as the elements of FIG. 4 operate the same as the elements described in FIG. 4. Accordingly, for the sake of brevity, the description of elements already described in FIG. 4 is omitted, but the elements of FIG. 6 having the same numerical identifiers as the elements in FIG. 4 are to be understood to be the same in structure and operation.

Diode 630, diode 632, zener diode 634, zener diode 640, capacitor 636, and capacitor 638 are electrically coupled to comprise a two output voltage regulation circuit whereby an electrical potential difference between primary ground 480 and secondary ground 482 is converted into two regulated voltages referenced to secondary ground 482. The first output voltage is available between diode 630 and capacitor 638. The second output voltage is available between diode 632 and capacitor 636.

Diode 630 allows current to flow from primary ground 480 through Y capacitor 418 and to capacitor 638 and zener diode 640 when diode 630 is forward biased. Diode 630 blocks current flow from capacitor 638 and zener diode 640 through Y capacitor 418 and to primary ground 480 when diode 630 is reverse biased. Capacitor 638 stores positive charge relative to secondary ground 482, capacitor 638 also filters an output voltage taken from between diode 630 and capacitor 638. Zener diode 640 limits current flow from primary ground 480 through Y capacitor 418 and diode 630 when zener diode 640 is reverse biased at voltages less than the zener breakdown voltage of zener diode 640. But, since zener diode 640 is in parallel with capacitor 638, capacitor 638 can charge when primary ground 480 is at a higher electrical potential than secondary ground 482 and when the voltage across zener diode 640 is less than the zener breakdown voltage of zener diode 640. Zener diode 640 allows current flow from primary ground 480 through Y capacitor 418 to secondary ground 482 across capacitor 638 when a voltage greater than the zener breakdown voltage of zener diode 640 is present across capacitor 638 and when zener diode 640 is reverse biased. Thus, zener diode 640 acts to regulate the voltage of capacitor 638 to the zener breakdown voltage of zener diode 640. In this way, the first regulated DC output positive voltage referenced to secondary ground 482 is produced from leakage current and switching noise.

Diode 632 allows current to flow from secondary ground 482 through capacitor 636, zener diode 634 (provided the zener breakdown voltage is exceeded), and through Y capacitor 418 to primary ground 480 when diode 632 is forward biased. Diode 632 blocks current flow from primary ground 480 through Y capacitor 418, zener diode 634, and capacitor 636 to secondary ground 482 when diode 632 is reverse biased. Capacitor 636 stores negative charge relative to secondary ground 482, capacitor 636 also filters an output voltage taken from between diode 632 and capacitor 636. Zener diode 634 permits current to flow from secondary ground 482 to diode 632, Y capacitor 418, and on to primary ground 480 when a voltage greater than the zener breakdown voltage of zener diode 634 is present across capacitor 636. Thus, zener diode 634 acts to regulate the voltage of capacitor 636 to the zener breakdown voltage. Further, zener diode 634 is biased opposite of the zener diode 640 with respect to the secondary ground. In this way, the second regulated DC output negative voltage referenced to secondary ground 482 is produced from leakage current and switching noise.

In this way, current may flow in a first current path through diode 630 or in a second current path through diode 632. The two current paths allow capacitors 638 and 636 to be charged so that two voltages are available from the electrical potential difference between primary ground 480 and secondary ground 482.

Thus, according to the circuit illustrated in FIG. 6, a plurality of regulated voltages referenced to a secondary ground can be provided by a voltage regulation circuit that converts leakage current and switching noise to DC. Further, at least one regulated voltage converted from leakage current and switching noise may be a positive voltage with respect to the secondary ground. Further still, at least one regulated voltage converted from leakage current and switching noise may be a negative voltage with respect to the secondary ground.

Referring now to FIG. 7, an example prophetic plot of a potential difference between a primary ground and a secondary ground as well as output of a voltage source that converts leakage current and switching noise to two levels of DC output is shown. In particular, the signals of FIG. 7 are representative for the electrical circuit of FIG. 6. In particular, signal 702 represents an electrical potential difference between a primary ground 480 and a secondary ground 482 for the circuit of FIG. 6. Signal 704 represents a positive output of a voltage source (e.g., elements 630, 638, and 640 of FIG. 6) with respect to secondary ground 482 that converts leakage current and switching noise to DC output. The Y axis represents a voltage level while the X axis represents time. A voltage level above the X axis is positive while a voltage level below the X axis is negative. Thus, FIG. 7 like FIG. 3 shows that the electrical potential difference between a primary ground and a secondary ground varies in amplitude and time.

Signal 704 is taken between capacitor 638 and diode 630 from the circuit shown in FIG. 6. Signal 706 represents a negative output of a voltage source (e.g., elements 632, 634, and 636 of FIG. 6) with respect to secondary ground 482 that converts leakage current and switching noise to DC output. In this example, signal 706 is taken between capacitor 636 and diode 632 from the circuit shown in FIG. 6. Signals 702, 704, and 706 are shown at different scale and are not shown for voltage level comparisons, but are rather illustrated to show that signals 704 and 706 can be produced from the voltage of signal 702.

Referring now to FIG. 8, an example circuit for converting leakage current and switching noise to two levels of DC output referenced to a primary ground is shown. The elements of FIG. 8 that have the same numerical identifiers as the elements of FIG. 4 operate the same as the elements described in FIG. 4. Accordingly, for the sake of brevity, the description of elements already described in FIG. 4 is omitted, but the elements of FIG. 8 having the same numerical identifiers as the elements in FIG. 4 are to be understood to be the same in structure and operation.

Diode 830, diode 840, zener diode 834, zener diode 838, capacitor 836, and capacitor 832 are electrically coupled to comprise a two output voltage regulation circuit whereby an electrical potential difference between primary ground 480 and secondary ground 482 is converted into two regulated voltages referenced to primary ground 480. The first output voltage is available between diode 830 and capacitor 836. The second output voltage is available between diode 840 and capacitor 832.

Diode 830 allows current to flow from secondary ground 482 through Y capacitor 818 and to capacitor 836 and zener diode 834 when diode 830 is forward bias. Diode 830 blocks current flow from capacitor 836 and zener diode 834 through Y capacitor 818 and to secondary ground 482 when diode 830 is reverse biased. Capacitor 836 stores positive charge relative to primary ground 480, capacitor 836 also filters an output voltage taken from between diode 830 and capacitor 836. Zener diode 834 permits current flow from secondary ground 482 through Y capacitor 818 and diode 830 when zener diode 834 is reversed biased at voltages less than the zener breakdown voltage of zener diode 834. But, since zener diode 834 is in parallel with capacitor 836, capacitor 836 can charge when secondary ground 482 is at a higher electrical potential than primary ground 480 and when the voltage across zener diode 834 is less than the zener breakdown voltage of zener diode 834. Zener diode 834 allows current flow from secondary ground 482 through Y capacitor 818 to primary ground 480 around capacitor 836 when a voltage greater than the zener breakdown voltage of zener diode 834 is present across capacitor 836 and when zener diode 834 is reverse biased. Thus, zener diode 834 acts to regulate the voltage of capacitor 836 to the zener breakdown voltage of zener diode 834. In this way, the first DC output positive voltage referenced to the primary ground 480 is produced from leakage current and switching noise.

Diode 840 allows current to flow from primary ground 480 through capacitor 832, zener diode 838 (provided the zener breakdown voltage is exceeded), and through Y capacitor 818 to secondary ground 482 when diode 840 is forward biased. Diode 840 blocks current flow from secondary ground 482 through Y capacitor 818, zener diode 838, and capacitor 832 to primary ground 480 when diode 840 is reverse biased. Capacitor 832 stores negative charge relative to primary ground 480, capacitor 832 also filters an output voltage taken from between diode 840 and capacitor 832. Zener diode 838 permits current to flow from primary ground 480 to diode 840, Y capacitor 818, and on to secondary ground 482 when zener diode 838 is reverse biased and when a voltage greater than the zener breakdown voltage of zener diode 838 is present across capacitor 832. Thus, zener diode 838 acts to regulate the voltage of capacitor 832 to the zener breakdown voltage of zener diode 838. In this way, a second DC output negative voltage referenced to primary ground 480 is produced from leakage current and switching noise.

In this way, current may flow in a first current path through diode 830 or in a second current path through diode 840. The two current paths allow capacitors 836 and 832 to be charged so that two voltages are available from the electrical potential difference between primary ground 480 and secondary ground 482.

Thus, according to the circuit illustrated in FIG. 8, a plurality of regulated voltages referenced to a primary ground can be provided by a voltage regulation circuit that converts leakage current and switching noise to DC. Further, at least one regulated voltage converted from leakage current and switching noise may be a positive voltage with respect to primary ground 480. Further still, at least one regulated voltage converted from leakage current and switching noise may be a negative voltage with respect to primary ground 480.

Referring now to FIG. 9, a method for converting leakage current and switching noise to DC output is shown. The method of FIG. 9 is applicable to the circuits of FIGS. 4, 6, and 8 as well as other anticipated circuit variations.

At 902, method 900 supplies a voltage to an input of a transformer. For example, a voltage is supplied between input terminal 460 and input terminal 462 of FIG. 4. In some examples, an AC input may be rectified before being applied to a primary side coil of a transformer. In other examples, a DC input may be applied to the primary side coil of a transformer. Method 900 proceeds to 904 after a voltage is applied to a transformer.

At 904, the primary coil of the transformer is switched to a primary ground on the primary side of the transformer. The transformer may be switched to the primary ground via a FET, bi-polar, MOSFET, or other known type of transistor. The transistor may be switched at a varying frequency or a varying pulse width. For example, as shown in the circuit of FIG. 4, switching transistor 414 switches primary coil 408 of transformer 406 to primary ground 480. Method 900 proceeds to 906 after transformer switching begins.

At 906, method 900 outputs a voltage from the secondary coil of the switched transformer. When the primary coil of the transformer is switched on, the primary coil is coupled to the primary ground thereby producing a magnetic field that stores energy within the transformer. When the primary coil of the transformer is switched off, the primary coil is uncoupled from the primary ground and the magnetic field collapses inducing current flow in the secondary coil of the transformer. The induced current provides a voltage at the secondary coil of the transformer which is output from the transformer. Method 900 proceeds to 908 after the transformer begins to output a voltage.

At 908, method 900 produces a regulated second voltage output from converting leakage current and switching noise that create an electrical potential difference between a primary ground and a secondary ground. The primary ground is on the primary side of the transformer while the secondary ground is on the secondary side of the transformer. The primary ground and the secondary grounds may be electrically isolated from each other. Further, in some examples a Y capacitor may be placed between the primary and secondary grounds. In one example, the regulated second voltage is output from the circuit of FIG. 4. In other examples, a plurality of voltages with different polarities and referenced to the secondary ground or the primary ground may be provided according to the circuits of FIGS. 6 and 8. Thus, the regulated voltages may be referenced to primary or secondary grounds. Method 900 proceeds to 910 after converting leakage current and switching noise to a regulated DC output.

At 910, method 900 judges whether or not to output voltage from the secondary coil of the transformer to an electrical load of a system. In one example, method outputs voltage from the secondary coil of the transformer to the electrical load in response to an operator input (e.g., a push button input). If power to the system is requested by the operator, method 900 proceeds to 912. Otherwise, method 900 proceeds to exit and power from the transformer secondary coil is not output to the system electrical load.

At 912, method 900 activates a transistor with the second voltage that is produced by converting leakage current and switching noise to a DC output. Activating the transistor couples the output of the transformer secondary coil to the system electrical load. In one example, the transistor is a FET and the FET begins to conduct when a positive voltage that is higher than the output secondary voltage with respect to the secondary ground is applied to the gate of the FET. For example, voltage from between diode 430 and capacitor 432 of FIG. 4 is applied to the gate of FET 452. When the second voltage is applied to the FET, the FET begins to conduct. In this way, a second voltage at a second voltage level, the second voltage produced by converting leakage current and switching noise to DC, activates a FET to couple a first voltage output from a transformer secondary coil to a system electrical load in response to an operator input. Method 900 proceeds to exit after outputting the voltage of the transformer secondary coil.

By making use of an electrical potential difference between a primary ground and a secondary ground of a power supply, a second voltage source can be provided. In one example, the second voltage source obtains power from leakage currents and switching noise. Thus, power that may otherwise directed to ground to reduce electrical noise is converted into a second voltage source that may be utilized by system components that operate at a different voltage level than the voltage level output by a power supply transformer.

The present description may provide several advantages. In particular, the approach can reduce power consumption since the second voltage source makes use of leakage current and switching noise rather than drawing directly from the secondary coil of the power supply transformer. Further, the approach can reduce system cost and weight because the second voltage is not produced by an auxiliary transformer coil.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A power converter comprising:
 a transformer comprising:
  a primary coil having in selective electrical communication with a primary ground; and
  a secondary coil in electrical communication with a secondary ground, the secondary ground different than the primary ground, the secondary coil configured to provide a first voltage;

a transistor comprising:
  a first terminal in selective electrical communication with a first terminal voltage, the first terminal voltage based on the first voltage;
  a second terminal in electrical communication with a regulated voltage, the regulated voltage based on an electrical potential difference between the primary ground and the secondary ground; and
a diode and a capacitor positioned in an electrical path between the primary ground and the secondary ground.

2. The power converter of claim 1, further comprising a rectifier positioned between the secondary coil and the first terminal, the rectifier rectifying the first voltage to provide the first terminal voltage.

3. The power converter of claim 2, wherein the rectifier comprises a second diode.

4. The power converter of claim 2, further comprising a filter configured to filter the first terminal voltage.

5. The power converter of claim 4, wherein the filter comprises a capacitor.

6. A power converter comprising:
an alternating current input terminal;
a rectifier coupled to the alternating current input terminal;
a transformer coupled to the rectifier, the transformer comprising:
  a primary coil in electrical communication with a primary ground; and
  a secondary coil in electrical communication with a secondary ground, the secondary ground electrically isolated from the primary ground; and
a voltage regulation circuit in series with a Y capacitor, the voltage regulation circuit and the Y capacitor positioned between and electrically coupled to the primary ground and the secondary ground.

7. The power converter of claim 6, where the Y capacitor is electrically coupled to the secondary ground via a zener diode.

8. The power converter of claim 7, further comprising a diode positioned electrically in parallel with the zener diode.

9. The power converter of claim 8, further comprising a filter capacitor positioned electrically in series with the diode and electrically in parallel with the zener diode.

10. The power converter of claim 9, where the filter capacitor is electrically coupled to a switch.

11. The power converter of claim 10, where the switch is electrically coupled to a transistor, and where the transistor selectively outputs a voltage based on an output voltage of the secondary coil.

12. The power converter of claim 6, where the Y capacitor is electrically coupled to an anode of a first diode and a cathode of a second diode.

13. The power converter of claim 12, where the first diode is electrically coupled to a first capacitor, where the second diode is electrically coupled to a second capacitor, and where the first and second capacitors are electrically coupled to the secondary ground.

14. A method for supplying primary and secondary power sources, comprising:
producing a first voltage based on the output of a transformer, the transformer having a primary ground and a secondary ground; and
producing a regulated second voltage via an electrical potential difference between the primary ground and the secondary ground, where the first voltage is electrically coupled and decoupled from an electrical load via a transistor that is activated and deactivated via the regulated second voltage.

15. The method of claim 14, where the regulated second voltage is supplied to a switch.

16. The method of claim 15, where the regulated second voltage is supplied to the transistor via the switch.

17. The method of claim 14, where the regulated second voltage is based on an output of a zener diode.

18. The method of claim 17, where the regulated second voltage is filtered via a capacitor.

* * * * *